United States Patent [19]
Colucci

[11] 3,799,577
[45] Mar. 26, 1974

[54] SAFETY BELT HAVING THREE FASTENING POINTS FOR THE SEAT OF A MOTOR CAR

[75] Inventor: Ivo Colucci, Milan, Italy

[73] Assignee: Alfa Romeo S.p.A., Milan, Italy

[22] Filed: May 4, 1972

[21] Appl. No.: 250,171

[30] Foreign Application Priority Data
May 6, 1971 Italy.................................. 24188/71

[52] U.S. Cl............................................. 280/150 SB
[51] Int. Cl.............................................. B60r 21/10
[58] Field of Search................... 280/150 SB, 150 B; 297/388, 389

[56] References Cited
UNITED STATES PATENTS
3,583,726  6/1971  Lindblad....................... 280/150 SB Primary Examiner—Robert R. Song
Attorney, Agent, or Firm—Holman & Stern

[57] ABSTRACT

A safety seat belt for motor cars is disclosed, in which an abdominal strap is connected to a swinging frame consisting of two arms parallelly placed with respect to the seat sidewalls, the connection taking place with the intermediary of a detent hook mechanism. A diagonal strap is also provided for completing the wrap of the wearer's body, recoiling means being provided to vary the length of the diagonal strap. Warning-signal emitting appliances can be provided to warn the wearer that he has not worn the belt or he has worn it incorrectly.

12 Claims, 5 Drawing Figures

PATENTED MAR 26 1974         3,799,577

SAFETY BELT HAVING THREE FASTENING POINTS FOR THE SEAT OF A MOTOR CAR

BACKGROUND OF THE INVENTION

This invention relates to a safety belt which is adapted to retain a passenger on the seat of a vehicle, especially when the vehicle is subjected to sudden speed differentials.

A number of kinds of these belts are known, which variously wrap the passenger's body and are removably fastened either to the seat or the car body.

It is well known, however, that both the driver and the passengers, due to the intolerance they have against the impression of constraint they may receive from the presence of the seat belts, or also on account of the intricacy of the controls for fastening and releasing the seat belts, often omit their use and expose themselves to serious damage which may be caused by a shock or even only by an intense deceleration of the vehicle in which they are travelling.

SUMMARY OF THE INVENTION

An object of the present invention is to provide a safety belt which can be either worn or released with an extremely simple manipulation.

A further object is to encourage a passenger towards wearing the seat belt, by rendering the use of the belt particularly inconvenient as the belt is in its inoperative position.

An important feature of the safety belt according to the present invention is that it does not provide for a fastening and releasing mechanism placed along the belt itself, so that, due to the pliability of the belt, it could be in a position which cannot be promptly found for a quick release especially under emergency conditions.

According to the present invention, the safety device which retains a passenger on the seat of a vehicle, comprises a transversal belt and a diagonal belt, intended to retain the abdomen and the chest of the passenger, respectively, and is characterized by two substantially parallel arms, which are pivotally connected at a first end in correspondence with the upper portion of the seat-back and movable in the plane of the sidewalls thereof, from a working position substantially aligned with the seat back, in which they are retained by releasable means, to a lifted at rest position, the transversal belt being affixed to the second ends of the arms and the diagonal belt comprising a semirigid portion linked to the second end of either arm so as to be moved from a first position substantially aligned with the transversal belt to a second position in which, when the arms are in the at rest position, the diagonal belt is arranged along a curved line which diagonally wraps the seatback, so as to wrap the passenger's body, the semirigid portion being extended into a flexible strip fastened to a fixed point of the vehicle.

According to a preferred embodiment, said abdominal belt is a flexible strip on which a semirigid tubular portion is slidable. In addition, another like flexible strip can be fastened to a fixed part of the vehicle and be extended internally of said semirigid portion of the diagonal belt and slide into a slot of the second end of the relative arm and be fastened to the second end of the other arm.

It could also be advisable to fasten the strip to the vehicle body by means which are adapted to resiliently rewind the strip when the arms are lifted in their at rest positions.

BRIEF DESCRIPTION OF THE INVENTION

In order that the features and the objects of the device according to the present invention may become clearer, an exemplary embodiment thereof will now be described, as illustrated in the accompanying drawings, wherein.

DETAILED DESCRIPTION OF PREFERRED EMBODIMENTS

Figure 1:
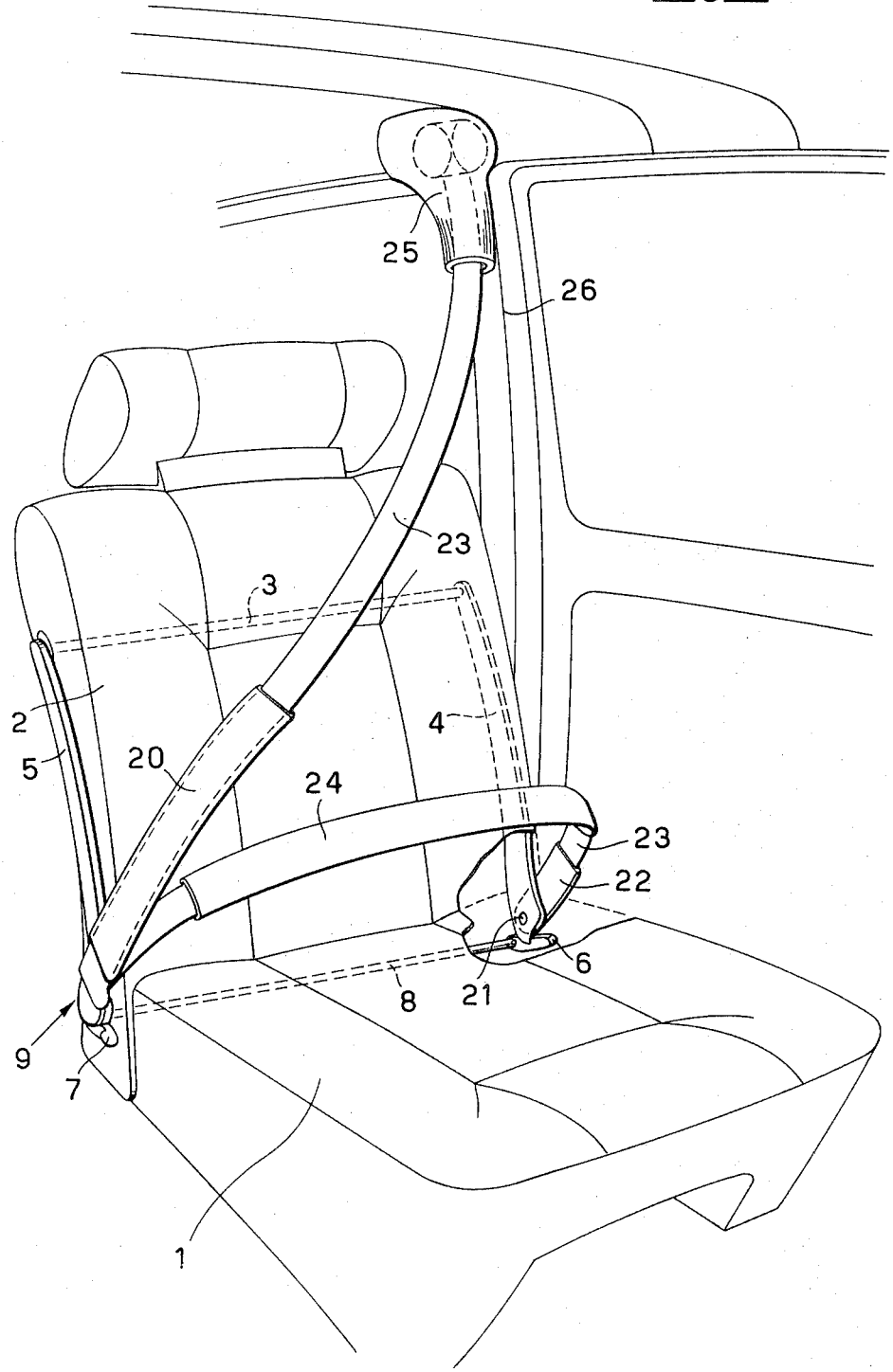
FIG. 1 is a perspective view of the safety device according to the present invention, as mounted on a motor car seat.

Having now particular reference to FIG. 1, there is shown a seat 1 having a back 2 in which there is rotatably journalled an arbor 3 on which the arms 4 and 5 are keyed. Each arm is engaged, when in the position shown in the drawing, by teeth 6 and 7, respectively, keyed to the arbor 8 which is supported for rotation by the seat.

Figure 3:
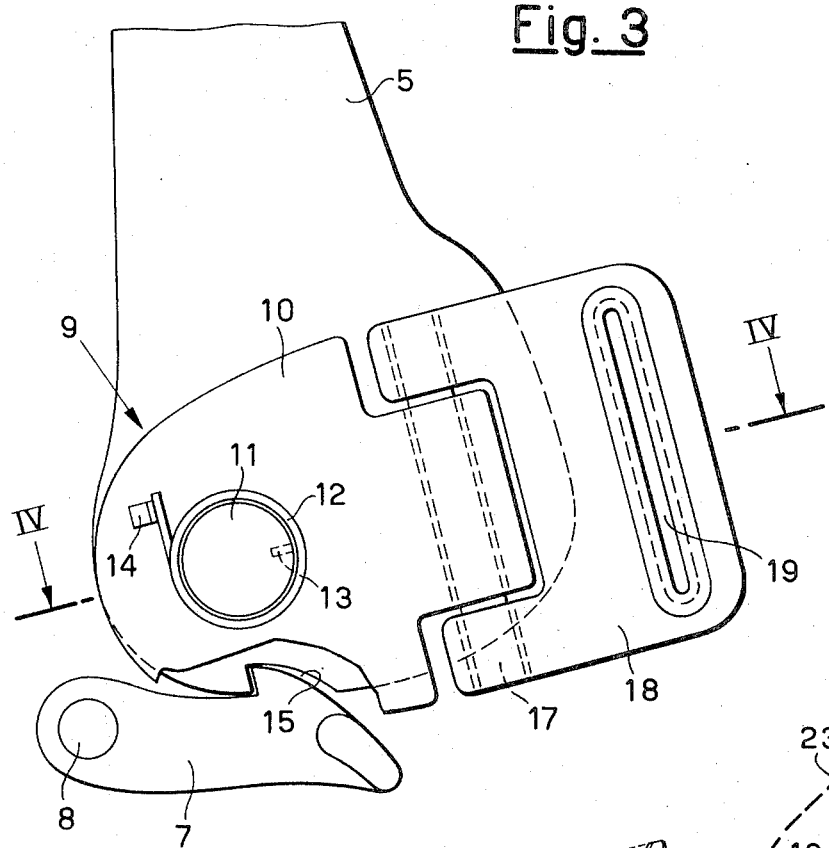
FIG. 3 is a close-up, partly in section, of the device according to the present invention.
Figure 4:
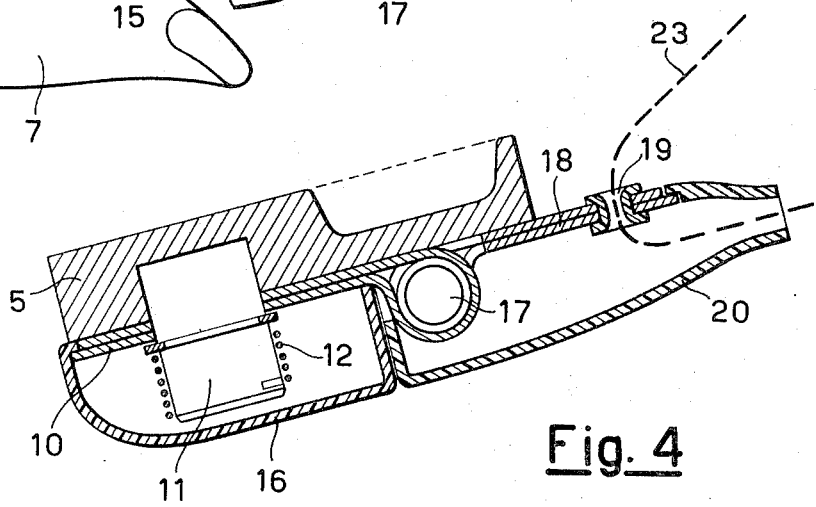
FIG. 4 is a cross-sectional view, taken along the line IV—IV of FIG. 3.

To the end of the arm 5 there is pivotally connected a joint, as generally indicated at 9 and more detailedly shown in FIGS. 3 and 4. The joint is composed by a portion 10 pivoted at 11 to the arm 5; a spring 12, connected at 13 to the pin 11 and at 14 to the arm 5, resiliently urges the portion 10 to be rotated clockwise as viewed in FIG. 3. In this FIGURE, it is also better shown how the tooth 7 is engaged into a corresponding notch 15 so as to hold the arm 5. Appropriate resilient means act upon the shaft 8 in the sense of causing the teeth to be engaged by the respective arms. A lid 16 is affixed to the portion 10 and is not shown for the sake of clarity in FIG. 3. To the portion 10 is pivoted at 17 a plate 18, with a slot 19, which is extended into a sheath 20, not shown in FIG. 3.

When the part 10 is placed in the angular position as shown in FIGS. 3 and 4, it is apparent that the plate 18 cannot be rotated by engagement with the surface of the arm 5. If, conversely, it is assumed that the component parts 10 and 18 are rotated clockwise through 90° about 11, it is apparent that the plate 18 can freely pivot about 17.

To the arm 4 is pivoted at 21 a swinging member 22 to which a flexible strap 23 is affixed, which slides into a belt 24 which has a tubular cross-sectional oblong shape, and which can thus slidably enter the slot 19 and extend into the semirigid sheath 20 until being taken up by the inertia rewind mechanism 25 affixed to an upright 26 of the car body, not shown in the drawings.

Figure 2:
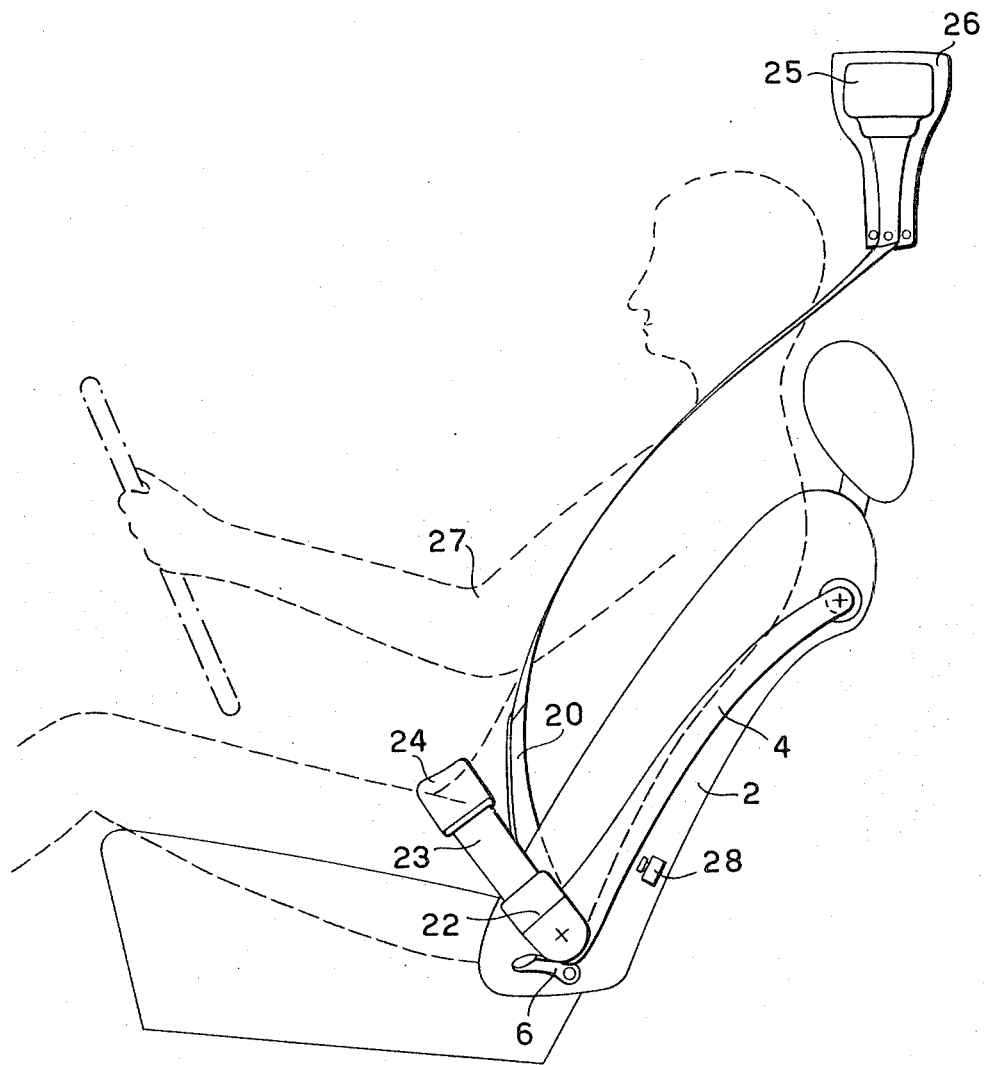
FIG. 2 shows a side elevational view of the device of FIG. 1.

The operation of the device described hereinabove will now be briefly explained. When the device is in the position shown in FIG. 1, it is active on the body of a passenger 27, as diagrammatically shown in dotted lines, in the sense of retaining him on the seat as shown in FIG. 2.

The belt 23 is held taut by the inertia recoiler 26: this is a conventional mechanism and is commonly applied to seat belts that is such that, in it, a mechanism automatically rewinds the belt under a preselected tension and permits that the belt may be gradually and slowly paid off with slight speed variations. When the belt, conversely, is suddenly drawn out with a jerking motion, suitable means hinder the belt's sliding. Thus the belt is paid off when recalled by slow movements by the passenger, whereas it is locked to retain him when he is violently thrust forward and tends to be separated from the seat-back.

To be disengaged from the belt, the passenger acts on either hook 6 or 7 so as to depress them. The arms 4 and 5 can readily be lifted and the joint 9 is aligned with the arm 5 so that the sheath 20 can be positioned as shown in FIG. 4.

When the device is so positioned, the arms can be further lifted so as to be positioned in a substantially vertical position and the passenger is entirely free.

An exactly opposite movement enables a seated passenger to wear the belt by depressing either arm 4 or 5.

Figure 5:
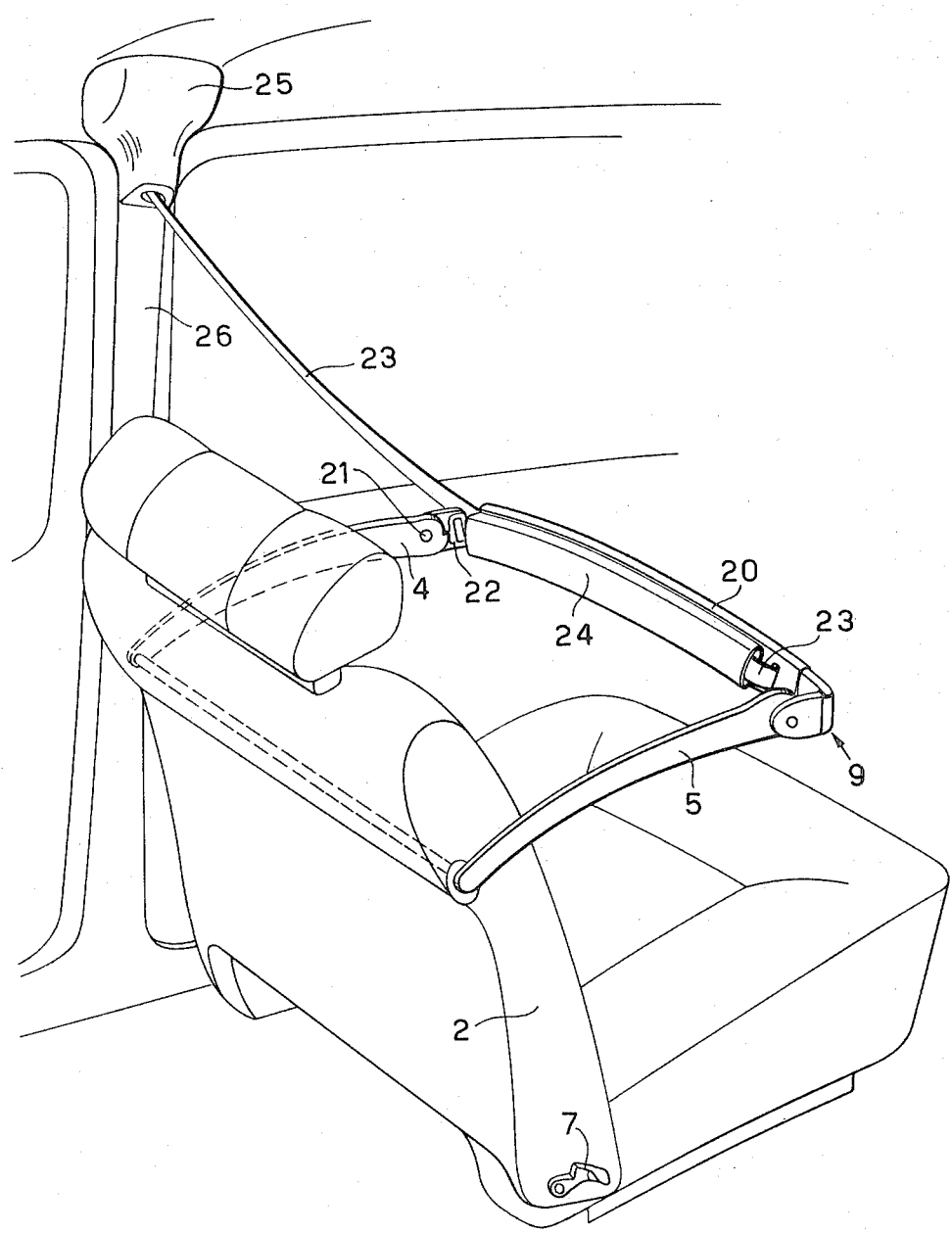
FIG. 5 is a perspective view of the device shown in FIG. 1, as viewed from another viewpoint.

It is important to notice that the sheath 24 prevents the belt 23 from rubbing the passenger's clothes and the comparative rigidity of the sheath 20 holds the diagonal strap on the plane of the seat's sidewall during the movement of the levers from the position of FIG. 5 to the top vertical position, thus preventing it from contacting the passenger's head. It should be observed that to actuate the safety device no cumbersome manual operations are required since a pressure on either arm 4 or 5 is enough to have them engaged by their respective hooks 6 and 7.

For the continuity of the belt 23 the resilient recall of the recoiler 25 is sufficient for holding taut both the abdominal strap and the diagonal strap of the safety device.

The device can be supplemented with advantage by switching means as diagrammatically indicated at 28, FIG. 2, which, when the arms are not engaged by their hooks, cut off the ignition circuit of the engine of the car on which the seat is mounted, as shown: thus it becomes impossible to run the car if the passengers do not wear their seat belts.

Likewise, the means 28 aforesaid could, conversely, cut off the electric starting motor of an internal combustion engine which is installed on the car, so as to make starting impossible when the arms are lifted. In addition, it could be advisable, as an alternative, that the ignition circuit when it is fed by current and the arms are lifted, may actuate through the switching means 28 a warning sound signal, which is annoying for the car occupants, in the interior of the car.

It can be understood that the passengers and the driver are persuaded to wear the belts if, due to the action of the means 28, the arms should be lowered when the car is running: the sheath 24 would thus make the use of the seat 1 inconvenient if the belt is not worn when the arms are lowered.

The resilient takeup of the belt by the device 26 tends to facilitate the lifting of the arms, but means could be provided to this purpose, such as resilient means acting on the arms either directly, or through their arbor 3, so as to lift the arms.

Many variations can be adopted of course for the device shown in the accompanying drawings and described hereinbefore. For example, the recoiler 26 can be merely replaced by a conventional simple locking device for the belt in a preselected position, so as to adapt occasionally the overall belt length to the size of the passenger who is to wear it.

Likewise, different solutions can be envisaged when embodying the retaining means 6 and 7 for the arms 4 and 5 to hold them lowered, as well as for controlling them.

What is claimed is:

1. A safety device for holding a passenger onto the seat of a vehicle by means of a flexible belt a first portion of which acts on the abdomen and a second portion of which acts on the passenger's chest, the dividing line between said first and second portions defining an intermediate portion of said belt, characterized by a first and a second arm one end of each arm being pivotally connected to the sides of the seat back at the upper portion thereof, the other ends being free whereby each arm is movable on a plane of the seat sidewall from a substantially vertical rest position to a lowered working position aligned with said seat back, releasable means for holding said arms in said working position, one end of the belt connected to the free end of the first arm, the other end of the belt connected to a first structural portion of the vehicle above said first arm and rearwardly of the seat back, the intermediate portion of the belt being slidably connected to the free end of said second arm, a retractor mounted on a second structural portion of the vehicle, said retractor being operatively connected to said other end of the belt such that said first portion of said belt is held taut between the free ends of said arms and said second portion being held taut between the free end of said second arm and said first structural portion of the vehicle.

2. A safety device according to claim 1, characterized in that said second portion of said belt comprises a semirigid portion linked to said free end of said arms and movable from a first position substantially adjacent to said first portion of said belt to a second position, in which, when said arms are in said lowered position, it is arranged along a line which diagonally wraps said seat back so as to wrap the lassenger's body.

3. A safety device according to claim 2, characterized in that said free end of said second arm carries a pivotally movable linked member having a hinge connected to said semirigid portion of said second portion of said belt.

4. A safety device according to claim 2, characterized in that said linked member, when said arm is lowered, is urged to take a mutual position with respect to that arm on which it is carried such that said hinge is locked and said semirigid portion is held in said second position.

5. A safety device according to claim 4, characterized in that said hinge is locked by the alignment thereof with a surface of said that arm of said first and second arms and is set free when said pivotally movable portion is overhanging with respect to said that arm.

6. A safety device according to claim 3, characterized in that said linked member is slidably connected to said first portion of said belt through said intermediate portion thereof.

7. A safety device according to claim 2, characterized in that said semirigid portion of said second portion of said belt consists of a sheath in whose interior said flexible belt is slidable.

8. A safety device according to claim 1, characterized in that a semirigid sheath surrounds said first portion of said flexible belt so that said flexible belt is slidable therein.

9. A safety device according to claim 1, characterized in that said second structural portion of the vehicle comprises recoiling means so that when said belt is connected thereto it is resiliently taken up thereby.

10. A safety device according to claim 9, characterized in that said recoiling means are of the inertial type so as to pay off said belt only if it is pulled with an accelerating force below a predetermined magnitude.

11. A safety device according to claim 1, characterized in that said first and second arms are integrally connected with one another.

12. A safety belt as claimed in claim 1 wherein said semirigid portion of said second portion of said belt consists of a sheath in whose interior said flexible belt is slidable.

* * * * *